United States Patent
Hashimoto et al.

(10) Patent No.: US 9,359,921 B2
(45) Date of Patent: Jun. 7, 2016

(54) SINTERED IRON-BASED ALLOY VALVE SEAT

(71) Applicant: KABUSHIKI KAISHA RIKEN, Tokyo (JP)

(72) Inventors: Kimiaki Hashimoto, Kumagaya (JP); Hiroji Henmi, Kumagaya (JP)

(73) Assignee: KABUSHIKI KAISHA RIKEN, Tokyo (JP)

( * ) Notice: Subject to any disclaimer, the term of this patent is extended or adjusted under 35 U.S.C. 154(b) by 2 days.

(21) Appl. No.: 14/412,910

(22) PCT Filed: Jul. 3, 2013

(86) PCT No.: PCT/JP2013/068228
§ 371 (c)(1),
(2) Date: Jan. 5, 2015

(87) PCT Pub. No.: WO2014/007278
PCT Pub. Date: Jan. 9, 2014

(65) Prior Publication Data
US 2015/0152753 A1      Jun. 4, 2015

(30) Foreign Application Priority Data
Jul. 6, 2012   (JP) .................................. 2012-152597

(51) Int. Cl.
*C22C 38/00* (2006.01)
*F01L 3/02* (2006.01)
(Continued)

(52) U.S. Cl.
CPC . *F01L 3/02* (2013.01); *C21D 6/002* (2013.01); *C22C 33/02* (2013.01);
(Continued)

(58) Field of Classification Search
CPC .............. F01L 3/02; F01L 3/22; C22C 33/02; C22C 33/0285; C22C 38/24; C22C 38/002; C22C 38/36; C22C 38/22; C22C 38/30; C22C 38/02; C22C 38/00; C21D 6/002; C21D 2211/004; C21D 2211/008; B22F 5/106; F16K 25/005
USPC .................................................. 251/359, 368
See application file for complete search history.

(56) References Cited

U.S. PATENT DOCUMENTS 4,129,444 A * 12/1978 Dreyer .................. B22F 1/0059
                                                                 419/10
4,345,943 A *  8/1982 Takahashi ........... C22C 33/0285
                                                                   75/236

(Continued)

FOREIGN PATENT DOCUMENTS

JP          61-19762 A       1/1986
JP          6-101429 A       4/1994
(Continued)

OTHER PUBLICATIONS

International Search Report, issued in PCT/JP2013/068228, dated Sep. 3, 2013.
(Continued)

*Primary Examiner* — John Bastianelli
(74) *Attorney, Agent, or Firm* — Birch, Stewart, Kolasch & Birch, LLP

(57) ABSTRACT

An iron-based sintered alloy valve seat having excellent wear resistance and machinability, which can be used for high-power diesel engines, an intermetallic compound having Vickers hardness Hv of 800-1200 is used, and C and P in the composition of the iron-based sintered valve seat are by mass 1.2-1.6% and 0.80-1.35%, respectively.

6 Claims, 2 Drawing Sheets

(51) Int. Cl.

| | |
|---|---|
| *F16K 25/00* | (2006.01) |
| *C22C 38/02* | (2006.01) |
| *C22C 38/22* | (2006.01) |
| *C22C 38/24* | (2006.01) |
| *C22C 38/30* | (2006.01) |
| *C22C 38/36* | (2006.01) |
| *C21D 6/00* | (2006.01) |
| *C22C 33/02* | (2006.01) |
| *F01L 3/22* | (2006.01) |
| *B22F 5/10* | (2006.01) |

(52) U.S. Cl.
CPC ............ *C22C 33/0285* (2013.01); *C22C 38/00* (2013.01); *C22C 38/002* (2013.01); *C22C 38/02* (2013.01); *C22C 38/22* (2013.01); *C22C 38/24* (2013.01); *C22C 38/30* (2013.01); *C22C 38/36* (2013.01); *F01L 3/22* (2013.01); *F16K 25/005* (2013.01); *B22F 5/106* (2013.01); *C21D 2211/004* (2013.01); *C21D 2211/008* (2013.01)

(56) References Cited

U.S. PATENT DOCUMENTS

| | | | | |
|---|---|---|---|---|
| 4,778,522 A | * | 10/1988 | Maki | .............. C22C 33/0278 75/238 |
| 4,966,626 A | * | 10/1990 | Fujiki | ............. C22C 33/0278 419/11 |
| 5,308,702 A | * | 5/1994 | Furukimi | ............. C22C 33/0207 428/403 |
| 5,507,257 A | | 4/1996 | Sakai et al. | |
| 5,820,105 A | * | 10/1998 | Yamaji | ................. C22C 19/055 251/331 |
| 6,139,599 A | * | 10/2000 | Takahashi | ........... C22C 33/0207 123/188.3 |
| 6,852,143 B2 | | 2/2005 | Hayashi et al. | |
| 8,844,903 B2 | | 9/2014 | Takahashi et al. | |
| 2002/0084004 A1 | | 7/2002 | Takahashi et al. | |
| 2002/0139448 A1 | | 10/2002 | Hayashi et al. | |
| 2004/0033154 A1 | * | 2/2004 | Liang | ............... C22C 33/0285 420/10 |
| 2007/0200082 A1 | * | 8/2007 | Crockett | ............... C22C 19/055 251/349 |
| 2008/0146467 A1 | * | 6/2008 | Takayama | ............ B22F 3/1035 508/105 |
| 2012/0319026 A1 | | 12/2012 | Takahashi et al. | |

FOREIGN PATENT DOCUMENTS

| | | |
|---|---|---|
| JP | 6-306409 A | 11/1994 |
| JP | 2002-129296 A | 5/2002 |
| JP | 3784003 B2 | 6/2006 |
| WO | WO 2011/105338 A1 | 9/2011 |

OTHER PUBLICATIONS

Written Opinion of the International Searching Authority, issued in PCT/JP2013/068228, dated Sep. 3, 2013.

* cited by examiner

SINTERED IRON-BASED ALLOY VALVE SEAT

FIELD OF THE INVENTION

The present invention relates to a valve seat for internal combustion engines, particularly to an iron-based sintered alloy valve seat having excellent wear resistance and machinability, which can be used for high-power, high-load diesel engines.

BACKGROUND OF THE INVENTION

Because valve seats mounted to cylinder heads in an internal combustion engine are repeatedly struck by valves in a high-temperature environment, various improvements have been made to improve their wear resistance, heat resistance, etc. Particularly in high-power, high-load diesel engines, a load tends to become increasingly higher on valve seats coming into contact with metal members, because of improvement in combustion efficiency for environmental protection. Accordingly, higher wear resistance than ever is required for valve seats at wider use temperatures. For diesel engine valve seats, for example, JP 61-19762 A discloses a wear-resistant sintered alloy capable of withstanding a thermal and mechanical load and having enough wear resistance, wherein titanium nitride particles are dispersed in a matrix in an area ratio of 2-30% to the matrix excluding pores; the matrix comprising by weight 1.0-3.0% of C, 0.2-1.0% of Si, 5.0-20% of Cr, 0.5-2.0% of Mo, 0.3-3.0% of V, and 0.02-0.5% in total of one or more of B, P and S, the balance being substantially Fe.

However, because TiN does not have high adhesion to the matrix, TiN dispersed in the matrix is easily detached, providing the alloy with poor machinability, thereby making it extremely difficult to machine the alloy. As a result, it is practically an expensive material. In addition, because it has relatively strong attackability to a mating body, it wears valves. Thus, diesel engine valve seats are required to have good machinability as well as improved wear resistance including so-called mating body attackability.

OBJECT OF THE INVENTION

In view of the above problems, an object of the present invention is to provide an iron-based sintered alloy valve seat having excellent wear resistance and machinability, which is used for high-power diesel engines.

A sintered alloy contains pores to some extent, and the pores induce so-called intermittent cutting, whose impact provides damage and accelerated wearing to tools. Accordingly, to improve machinability, the densification of the sintered alloy is important.

SUMMARY OF THE INVENTION

As a result of intensive research on iron-based sintered alloy valve seats, the inventors have found that when an intermetallic compound having Vickers hardness Hv of 800-1200 is used, and when C and P are limited to 1.2-1.6% and 0.80-1.35%, respectively, by mass in the composition of the iron-based sintered valve seat, an iron-based sintered alloy valve seat having excellent wear resistance and machinability is obtained.

Thus, the iron-based sintered alloy valve seat of the present invention comprises 5-14% by volume of hard intermetallic compound particles having an average particle size of 5-200 µm and Vickers hardness Hv of 800-1200 dispersed in a matrix having a composition comprising C, Si, Cr, Mo, V and P, the balance being Fe and inevitable impurities; C and P being by mass 1.2-1.6% and 0.80-1.35%, respectively, based on the iron-based sintered valve seat. It is preferable to use a raw material powder formulated such that the matrix has a composition comprising by mass 1.3-1.85% of C, 0.4-0.8% of Si, 10.0-13.0% of Cr, 0.8-1.2% of Mo, 1.7-2.2% of V, and 0.80-1.72% of P, the balance being Fe and inevitable impurities.

The hard particles are preferably made of an Fe—Mo—Si alloy and/or a Cr—W—Co—Fe alloy. The Fe—Mo—Si alloy preferably comprises by mass 40-70% of Mo, 0.4-2.0% of Si, and 0.1% or less of C, the balance being Fe and inevitable impurities, and the Cr—W—Co—Fe alloy preferably comprises by mass 27-33% of Cr, 22-28% of W, and 8-12% of Co, the balance being Fe and inevitable impurities. When the Fe-Mo-Si alloy is used for hard particles, Si, Cr, Mo and V in the composition of the iron-based sintered valve seat are preferably by mass 0.5-0.9%, 8.0-11.0%, 5.0-10.0%, and 1.4-1.9%, respectively, based on the iron-based sintered valve seat.

To have excellent wear resistance and machinability, the iron-based sintered alloy valve seat preferably has a density of 7.5-7.8 g/cm$^3$ by densification due to liquid-phase sintering.

DESCRIPTION OF THE PREFERRED EMBODIMENTS

Figure 1:
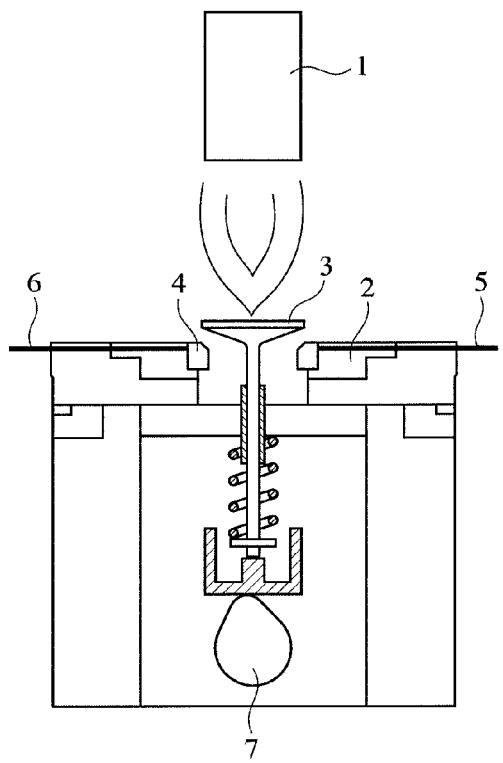
FIG. 1 is a schematic view showing a wear test for evaluating the wear resistance of the iron-based sintered alloy valve seat of the present invention.

The iron-based sintered alloy valve seat of the present invention is composed of a matrix, and hard intermetallic compound particles dispersed in the matrix. The hard intermetallic compound particles have an average particle size of 5-200 µm and Vickers hardness Hv of 800-1200. With the Vickers hardness Hv less than 800, the valve seat has low wear resistance. With Hv exceeding 1200, the valve seat has low toughness, suffering increased chipping and cracking, resulting in easy detachment of hard particles. The average particle size of less than 5 µm has substantially no effect on wear resistance, and the average particle size exceeding 200 µm provides the valve seat with poor formability, and thus low density and wear resistance. The amount of hard particles dispersed is 5-14% by volume. Less than 5% by volume of hard particles do not have effect on wear resistance, and more than 14% by volume of hard particles undesirably hinder the densification of the valve seat, resulting in low machinability and increased attack to a mating member.

The intermetallic compounds usable as hard particles are Fe-based materials such as Fe—Mo alloys, Fe—Mo—Si alloys, Fe—W alloys, Fe—Cr alloys, Fe—Si alloys, Fe—B alloys; Co-based materials such as Co—W—Cr alloys, Co—Si—Cr—Mo—Ni alloys, Co—Mo—Cr—Si alloys, Co—Cr—Ni—Fe alloys, etc. Among them, Fe—Mo—Si alloys and/or Cr—W—Co—Fe alloys are preferable. Fe—Mo—Si alloys preferably comprise by mass 40-70% of Mo, 0.4-2.0% of Si, and 0.1% or less of C, the balance being Fe and inevitable impurities. Cr—W—Co—Fe alloys preferably comprise by mass 27-33% of Cr, 22-28% of W, 8-12% of Co, and 1.7-2.3% of C, the balance being Fe and inevitable impurities.

The matrix except for hard particles has a composition comprising C, Si, Cr, Mo, V and P, the balance being Fe and inevitable impurities. Among them, C and P are 1.2-1.6% by mass and 0.80-1.35% by mass, respectively, based on the entire iron-based sintered valve seat.

C is generally dissolved in the matrix to strengthen it, and combined with other alloying elements to form carbides, thereby improving wear resistance. In the present invention, when C is less than 1.2% by mass based on the iron-based sintered valve seat, soft ferrite is formed, failing to obtain the desired hardness, so that the valve seat has insufficient wear resistance. When C exceeds 1.6% by mass, excessive carbides are formed, so that the valve seat has extremely high attackability to a valve. Accordingly, the iron-based sintered valve seat contains 1.2-1.6% by mass of C. The amount of C in the matrix except for hard particles is preferably 1.3-1.85% by mass.

P added as FeP (P: 26.6% by mass) forms a liquid phase at a sintering temperature, promoting densification. Because P has a smaller effect of embrittling the iron-based sintered alloy than B and S, a relatively large amount of P can be added if used alone. In the present invention, less than 0.80% by mass (less than about 3% by mass as FeP based on the entire iron-based sintered valve seat) of P has a small effect of densifying the iron-based sintered valve seat, and more than 1.35% by mass (more than about 5% by mass as FeP based on the entire iron-based sintered valve seat) of P has an adverse effect such as tempering brittleness, etc. Accordingly, P is 0.80-1.35% by mass (3-5% by mass as FeP based on the entire iron-based sintered valve seat). The addition of an optimum amount of P (FeP) promotes the densification of the iron-based sintered alloy of the present invention, enabling densification to a density of 7.5-7.8 g/cm$^3$, or a relative density of 95% or more. Densification to this level makes unnecessary sealing with a resin, etc., which has conventionally been conducted to improve machinability, though it does not prevent sealing. The amount of P in the matrix except for hard particles is preferably 0.80-1.72% by mass.

Si in the matrix except for hard particles lowers a liquid-phase-forming temperature in the presence of Cr, suppressing the formation of coarse carbides and thus making the structure finer. The amount of Si added is preferably 0.4-0.8% by mass. Part of Cr, Mo and V are dissolved in the matrix to strengthen it, and the remaining portions thereof are combined with C to form carbides, improving wear resistance. Dissolved in the matrix, Cr improves corrosion resistance, and Mo increases hardenability and high-temperature strength. V forms particularly fine, hard carbides to strengthen the matrix, thereby improving wear resistance. With too little amounts of Cr, Mo and V, these effects are insufficient. It is preferable to use raw material powder formulated such that the matrix except for hard particles comprises by mass 10-13% of Cr, 0.8-1.2% of Mo, and 1.7-2.2% of V. Because alloy components forming hard particles can be diffused to the matrix during sintering, hard particles and the matrix have good bonding boundaries. Because the matrix of the iron-based sintered valve seat finally contains more alloy components than added, the matrix is more strengthened. Particularly Mo is easily diffused from hard particles to the matrix.

When an Fe—Mo—Si alloy is used for hard particles, the iron-based sintered valve seat preferably has a composition comprises by mass 0.5-0.9% of Si, 8.0-11.0% of Cr, 5.0-10.0% of Mo, and 1.4-1.9% of V.

In the production of the iron-based sintered alloy valve seat of the present invention, a raw material for the matrix may be iron powder mixed with alloying element metal powders or ferroalloy powders, graphite powder, etc., or alloy powder alloyed to a predetermined composition in advance (prealloy powder). Iron powder and/or prealloy powder and alloying element powders for the matrix are mixed with hard intermetallic compound particles to provide mixed raw material powder. As described above, a mixture of iron powder and/or prealloy powder and alloying element powders for the matrix preferably has a composition comprising by mass 1.3-1.85% of C, 0.4-0.8% of Si, 10.0-13.0% of Cr, 0.8-1.2% of Mo, 1.7-2.2% of V, and 0.80-1.72% of P, the balance being Fe and inevitable impurities. 0.5-2% of stearate, etc. may be added as a parting agent to the mixed raw material powder composed of iron powder, prealloy powder, alloying element powders and hard particles. The mixed powder is compression-molded to a compacted body by pressing, etc., and the compacted body is sintered in a temperature range of 980-1150° C. in vacuum or in a non-oxidizing (or reducing) atmosphere, and then tempered in a temperature range of 550-750° C.

When the sintering temperature is lower than 980° C., a liquid phase is formed in an insufficient amount to obtain a predetermined strength. On the other hand, when sintered at a temperature exceeding 1150° C., coarse carbides grow to form a network structure, resulting in deteriorated wear resistance. The non-oxidizing (or reducing) atmosphere is desirably an $NH_3$ gas, a mixed gas of $N_2$ and $H_2$, etc.

EXAMPLES 1-6 AND COMPARATIVE EXAMPLES 1-4

A prealloy powder comprising 11.3% of Cr, 0.96% of Mo, 1.9% of V, 0.78% of Si, and 1.1% of C, the balance being Fe (and inevitable impurities), which had a particle size distribution having a peak in 150-200 mesh, was mixed with graphite powder in such an amount that the resultant matrix had the C content shown in Table 1, and blended with FeP functioning as a liquid-phase-forming aid in an amount of 3-5% based on the entire sintered alloy including hard particles (% by mass in the matrix in Table 1), and 10 or 15% by mass of hard Fe—Mo—Si alloy particles having Vickers hardness Hv of 1175 and an average particle size of 29 μm by a mixer to provide a mixed powder. Table 1 shows the composition of a matrix and the mixing ratio of hard Fe—Mo—Si particles in each Example and Comparative Example. Incidentally, 0.5% by mass of zinc stearate based on the raw material powder was added to improve parting in the molding process. The Fe—Mo—Si alloy used had a composition comprising by mass 60.87% of Mo, 1.20% of Si, and 0.05% of C, the balance being Fe and inevitable impurities.

TABLE 1

| No. | Matrix Composition (% by mass) | | | | | | | Fe—Mo—Si (% by mass) |
|---|---|---|---|---|---|---|---|---|
| | Cr | Mo | V | Si | C | P (FeP) | Fe | |
| Example 1 | 10.9 | 0.92 | 1.83 | 0.75 | 1.46 | 0.94 (3.5) | Bal. | 15 |
| Example 2 | 10.9 | 0.92 | 1.83 | 0.75 | 1.60 | 0.89 (3.3) | Bal. | 10 |
| Example 3 | 10.8 | 0.92 | 1.82 | 0.75 | 1.81 | 0.94 (3.5) | Bal. | 15 |
| Example 4 | 10.9 | 0.92 | 1.83 | 0.75 | 1.69 | 0.94 (3.5) | Bal. | 15 |
| Example 5 | 10.7 | 0.91 | 1.80 | 0.74 | 1.69 | 1.25 (4.7) | Bal. | 15 |
| Example 6 | 10.6 | 0.90 | 1.78 | 0.73 | 1.69 | 1.56 (5.9) | Bal. | 15 |
| Com. Ex. 1 | 10.9 | 0.93 | 1.83 | 0.75 | 1.28 | 0.94 (3.5) | Bal. | 15 |
| Com. Ex. 2 | 10.9 | 0.92 | 1.82 | 0.75 | 1.88 | 0.89 (3.3) | Bal. | 10 |
| Com. Ex. 3 | 10.9 | 0.93 | 1.83 | 0.75 | 1.98 | 0.94 (3.5) | Bal. | 15 |
| Com. Ex. 4 | 11.0 | 0.93 | 1.85 | 0.76 | 1.69 | 0.63 (2.4) | Bal. | 15 |

In Examples 1 and 2, the amounts by mass of P (FeP) in the matrices are different, but the mass ratios of P (FeP) to the entire sintered alloys are equal. In Examples 5 and 6, the ratios of P (FeP) to the entire sintered alloys are different.

Each mixed powder was introduced into a molding die, compression-molded at pressure of 6.5 t/cm$^2$ by pressing, and then sintered at 1120° C. in vacuum to produce a ring-shaped sintered body having an outer diameter of 37.6 mm, an inner diameter of 26 mm and a thickness of 8 mm, which was then tempered at 690° C. Each ring-shaped sintered body of Examples 1-6 thus obtained contained hard particles (Fe—Mo—Si alloy) dispersed in a matrix of tempered martensite. Comparative Examples 1-4 used matrix-forming mixed powders each composed of iron powder and/or prealloy powder and alloying element powder, which contained less than 1.3% by mass of C (Comparative Example 1, C: 1.28% by mass), more than 1.85% by mass of C (Comparative Examples 2 and 3, C: 1.88% and 1.98% by mass, respectively), and less than 0.8% by mass of P (Comparative Example 4, P: 0.63% by mass), to obtain ring-shaped sintered bodies in the same manner as in Examples 1-6. In Example 1 and Example 9 described later, energy dispersive X-ray spectroscopy (EDX) revealed that their matrices comprised by mass 0.70% and 0.80% of Si, 10.5% and 10.5% of Cr, 4.4% and 4.2% of Mo, and 1.6% and 1.7% of V. It was confirmed that a large amount of Mo was diffused from hard particles to the matrix.

The sintered bodies were measured with respect to density (and relative density to 100% of the theoretical density) by an Archimedean method, and HRC hardness by a Rockwell hardness meter. Further, the volume ratio (equal to area ratio) of hard particles was determined by the image analysis of a backscattered electron image obtained by a scanning electron microscope (SEM), which was binarized utilizing composition difference between the hard particles and the matrix. The results are shown in Table 2.

[1] Wear Test

Each ring-shaped sintered body was machined to a valve seat to evaluate its wear resistance by a wear test machine shown in FIG. 1. In the test machine, a valve seat 4 is pressed into a valve seat holder 2 of a material corresponding to a cylinder head. With a valve 3 and the valve seat 4 heated by a burner 1, a wear test is conducted by moving the valve 3 by the rotation of a cam 7. A thermocouple 5, 6 is buried in the valve seat 4 to control the output of the burner 1, such that an abutting surface of the valve seat is heated to a predetermined temperature. The valve seat 4 was worn by the repeated strike of the valve 3, and the amount of its wear was determined as a receding distance of the abutting surface, by measuring the sizes of the valve seat and the valve before and after the test. The valve used was formed by welding Stellite (registered trademark) #12, which was composed of 29-31% by mass of Cr, 1.4-1.8% by mass of C, and 8% by mass of W, the balance being Co, to an SUH alloy (JIS G 4311) to a size adapted to the above valve seat. The test conditions were a temperature of 250° C. on the abutting surface of the valve seat, a cam rotation number of 2000 rpm, and a test time of 5 hours. The test results are shown in Table 2, together with the densities (relative densities) and HRC hardness of the sintered bodies.

TABLE 2

| No. | Sintered Body | | Rockwell Hardness HRC | Hard Particles (% by volume) | Wear (μm) | | |
|---|---|---|---|---|---|---|---|
| | Density (g/cm$^3$) | Relative Density (%) | | | Valve Seat | Valve | Total |
| Example 1 | 7.5 | 95.5 | 24.5 | 11.1 | 20 | 7.9 | 27.9 |
| Example 2 | 7.57 | 97.4 | 26.4 | 6.3 | 13 | 9.7 | 22.7 |
| Example 3 | 7.64 | 97.3 | 36.5 | 11.0 | 11 | 12.1 | 23.1 |
| Example 4 | 7.58 | 96.5 | 30.3 | 11.4 | 9.5 | 11.5 | 21.0 |
| Example 5 | 7.67 | 97.7 | 35.0 | 10.8 | 12 | 11.5 | 23.5 |
| Example 6 | 7.66 | 97.6 | 36.0 | 10.7 | 11.6 | 11.8 | 23.4 |
| Com. Ex. 1 | 7.45 | 94.8 | 21.1 | 11.1 | 40 | 8 | 48 |
| Com. Ex. 2 | 7.64 | 98.4 | 40.2 | 6.2 | 27.4 | 32.5 | 59.9 |
| Com. Ex. 3 | 7.71 | 98.3 | 42.8 | 10.9 | 13.5 | 33.3 | 46.8 |
| Com. Ex. 4 | 7.16 | 90.8 | 20.0 | 11.3 | 30.4 | 10.3 | 40.7 |

Figure 2:
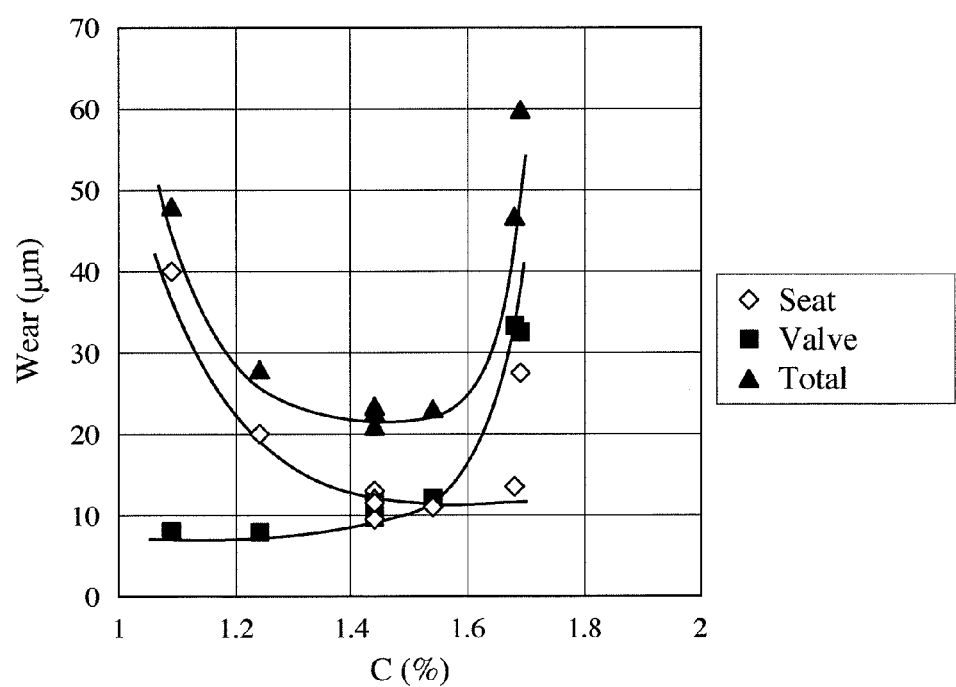
FIG. 2 is a graph showing the relation between the wear of valve seats and valves mating them and the C content (%) in Examples within the present invention and Comparative Examples.

The sintered bodies were extremely dense, with densities of 7.5-7.67 g/cm$^3$ (95.5-97.7% as relative density). The Rockwell hardness HRC of the sintered bodies was 24.5-36.5, increasing as the amount of C increased. In the composition range of the present invention, it was clarified that C increased not only hardness by the formation of carbides but also sinterability. In FIG. 2, the wear of the valve seat and the valve and their total wear are plotted against the amount of C (%) in the matrix. The wear of the valve is extremely small at a low C content (%), but extremely increases as the C content (%) increases. On the other hand, the wear of the valve seat is high at a low C content (%), but slightly increases as the C content (%) increases. The total wear of the valve and the valve seat drastically increases when the C content becomes less than 1.2% by mass, and drastically increases when the C content becomes more than 1.6% by mass. It was found that with C in a range of 1.2-1.6% by mass, the total wear of the valve and the valve seat was extremely low.

Because the sintered body of Comparative Example 4 was not densified, with a density of 7.16 g/cm$^3$ and a relative density of 90.8%, it had low hardness, and the valve seat was much worn. It was found that the addition of 0.8% or more by mass of P (about 3.0% or more by mass of FeP based on the entire sintered alloy) was effective for densification.

EXAMPLE 7

Mixing, molding and sintering were conducted in the same manner as in Example 4, except for adding 15% by mass of a Cr—W—Co—Fe alloy having Vickers hardness Hv of 980 and an average particle size of 28 μm as hard particles, to produce a ring-shaped sintered body. The Cr—W—Co—Fe alloy used had a composition comprising by mass 31.8% of Cr, 22.0% of W, 8.4% of Co, and 2.1% of C, the balance being Fe and inevitable impurities. The density and hardness of the sintered body were measured, and the same wear test as in Example 4 was conducted. The matrix composition and the type and mixing ratio of the hard particles are shown in Table 3, and the density and hardness of the sintered body and the wear test results are shown in Table 4.

EXAMPLE 8

Mixing, molding and sintering were conducted in the same manner as in Example 4, except for adding 10% by mass of the Fe—Mo—Si alloy used in Example 4 and 5% by mass of the Cr—W—Co—Fe alloy used in Example 7 as hard particles, to produce a ring-shaped sintered body. The density and hardness of the sintered body were measured, and the same wear test as in Example 4 was conducted. The matrix composition and the type and mixing ratio of hard particles are shown in Table 3, and the density and hardness of the sintered body and the wear test results are shown in Table 4 together with those of Example 7.

Example 9

A ring-shaped sintered body was produced in the same manner as in Example 4, except that sintering was conducted at 1120° C. in a mixed gas atmosphere of $N_2+H_2$, in place of 1120° C. in vacuum. The density and hardness of the sintered body were measured, and the same wear test as in Example 4 was conducted. The matrix composition and the type and mixing ratio of hard particles are shown in Table 3, the density and hardness of the sintered body and the wear test results are shown in Table 4 together with those of Examples 7 and 8. Sintering in a mixed gas atmosphere of $N_2 + H_2$ resulted in surface nitridization and as high hardness as HRC 46.3.

COMPARATIVE EXAMPLE 5

A ring-shaped sintered body was produced as Comparative Example 5 in the same manner as in Example 4, except for using 10% by mass of TiN having an average particle size of 10 μm in place of the hard intermetallic compound particles. The density and hardness of the sintered body were measured, and the same wear test as in Example 4 was conducted. The matrix composition and the type and mixing ratio of hard particles are shown in Table 3, and the density and hardness of the sintered body and the wear test results are shown in Table 4 together with those of Examples 7-9. The measured hardness of Comparative Example 5 indicates that high-hardness TiN (Hv 2000-2400) increased the hardness of the sintered body. Both valve seat and valve were much worn. The composition of the sintered body is shown in Table 5 together with the data of Examples 1-9 and Comparative Examples 1-5.

TABLE 3

| No. | Matrix Composition (% by mass) | | | | | | | Fe—Mo—Si (% by mass) | Cr—W—Co—Fe (% by mass) | TiN (% by mass) |
| --- | --- | --- | --- | --- | --- | --- | --- | --- | --- | --- |
| | Cr | Mo | V | Si | C | P | Fe | | | |
| Example 7 | 10.9 | 0.92 | 1.83 | 0.75 | 1.69 | 0.94 | Bal. | 0 | 15 | 0 |
| Example 8 | 10.9 | 0.92 | 1.83 | 0.75 | 1.69 | 0.94 | Bal. | 10 | 5 | 0 |
| Example 9* | 10.9 | 0.92 | 1.83 | 0.75 | 1.69 | 1.25 | Bal. | 15 | 0 | 0 |
| Com. Ex. 5 | 10.9 | 0.92 | 1.83 | 0.75 | 1.98 | 0.89 | Bal. | 0 | 0 | 10 |

*The sintering atmosphere in Example 9 was a mixed gas of $N_2 + H_2$.

TABLE 4

| No. | Sintered Body | | Rockwell Hardness HRC | Hard Particles (% by volume) | Wear (μm) | | |
| --- | --- | --- | --- | --- | --- | --- | --- |
| | Density (g/cm$^3$) | Relative Density (%) | | | Valve Seat | Valve | Total |
| Example 7 | 7.71 | 95.9 | 25.5 | 9.8 | 17.2 | 7.5 | 24.7 |
| Example 8 | 7.69 | 97.2 | 26.8 | 10.5 | 14.2 | 10.2 | 24.4 |
| Example 9 | 7.59 | 96.8 | 46.3 | 11.1 | 8.9 | 13.2 | 22.1 |
| Com. Ex. 5 | 7.15 | 96.0 | 39.0 | 12.3 | 20.1 | 22.1 | 42.2 |

TABLE 5

| No. | Composition of Entire Sintered Body (% by mass) | | | | | | | | | |
|---|---|---|---|---|---|---|---|---|---|---|
| | Cr | Mo | V | Si | C | P | W | Co | Ti | Fe |
| Example 1 | 9.2 | 9.92 | 1.55 | 0.82 | 1.24 | 0.80 | — | — | — | Bal. |
| Example 2 | 9.8 | 6.92 | 1.64 | 0.80 | 1.44 | 0.80 | — | — | — | Bal. |
| Example 3 | 9.2 | 9.92 | 1.55 | 0.82 | 1.54 | 0.80 | — | — | — | Bal. |
| Example 4 | 9.2 | 9.92 | 1.55 | 0.82 | 1.44 | 0.80 | — | — | — | Bal. |
| Example 5 | 9.1 | 9.91 | 1.53 | 0.82 | 1.44 | 1.06 | — | — | — | Bal. |
| Example 6 | 9.0 | 9.90 | 1.51 | 0.81 | 1.44 | 1.33 | — | — | — | Bal. |
| Example 7 | 14.0 | 0.78 | 1.55 | 0.64 | 1.44 | 0.80 | 3.3 | 1.26 | — | Bal. |
| Example 8 | 10.8 | 6.87 | 1.55 | 0.76 | 1.44 | 0.80 | 1.1 | 0.42 | — | Bal. |
| Example 9 | 9.1 | 9.91 | 1.53 | 0.82 | 1.44 | 1.06 | — | — | — | Bal. |
| Com. Ex. 1 | 9.2 | 9.92 | 1.55 | 0.83 | 1.09 | 0.80 | — | — | — | Bal. |
| Com. Ex. 2 | 9.7 | 6.92 | 1.64 | 0.80 | 1.69 | 0.80 | — | — | — | Bal. |
| Com. Ex. 3 | 9.2 | 9.92 | 1.54 | 0.82 | 1.68 | 0.80 | — | — | — | Bal. |
| Com. Ex. 4 | 9.3 | 9.93 | 1.57 | 0.83 | 1.44 | 0.53 | — | — | — | Bal. |
| Com. Ex. 5 | 9.7 | 0.83 | 1.64 | 0.67 | 1.68 | 0.80 | — | — | 7.7 | Bal. |

[2] Machinability Test

The sintered bodies of Examples 1-9 and Comparative Examples 1-5 were then subjected to a so-called traverse-type cutting test, under a dry condition (without using a cutting liquid) at a cutting speed of 100 m/min, a cutting depth of 0.1 mm, and a feed of 0.1 mm/rev, using a usual lathe. Using a CBN chip as a cutting tool, the machinability was evaluated by a cutting distance until a flank of the chip was worn to a predetermined depth. The results are shown in FIG. 3.

Figure 3:
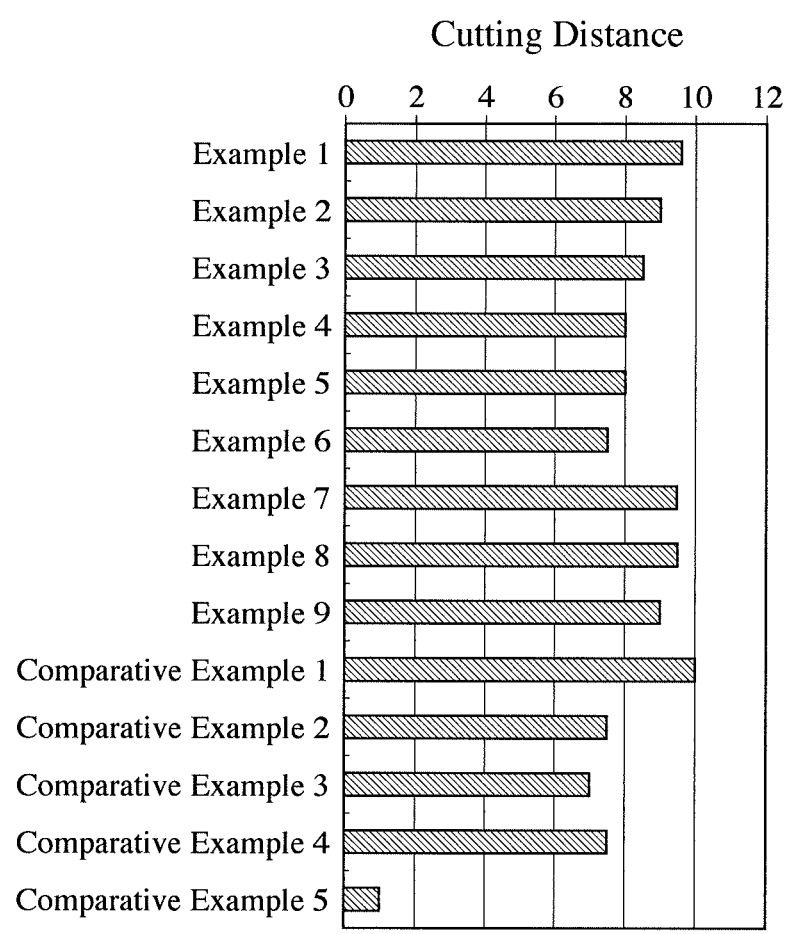
FIG. 3 is a graph showing the machinability test results of valve seats in Examples within the present invention and Comparative Examples.

FIG. 3 shows relative cutting distances with that of Comparative Example 5 as 1. As compared with Comparative Example 5 using TiN as hard particles, the present invention using the intermetallic compound as hard particles exhibited excellent machinability, and the iron-based sintered valve seat exhibited reduced machinability as C exceeded 1.6% by mass.

EFFECTS OF THE INVENTION

With 5-14% by volume of hard intermetallic compound particles having Vickers hardness Hv of 800-1200 dispersed, and particularly 1.2-1.6% by mass of C contained in the composition, the iron-based sintered alloy valve seat of the present invention is usable as a diesel engine valve seat having high wear resistance and machinability. The addition of 0.80-1.35% by mass of P to the iron-based sintered valve seat contributes to densification by liquid-phase sintering, suppressing the detachment of hard particles and avoiding intermittent cutting, thereby contributing to both wear resistance and machinability. Further, it makes unnecessary sealing by resin impregnation, etc. for improving machinability, contributing to cost reduction.

What is claimed is:

1. An iron-based sintered valve seat comprising 5-14% by volume of hard intermetallic compound particles having an average particle size of 5-200 μm and Vickers hardness Hv of 800-1200 dispersed in a matrix having a composition comprising C, Si, Cr, Mo, V and P, the balance being Fe and inevitable impurities; C and P being by mass 1.2-1.6% and 0.80-1.35%, respectively, based on said iron-based sintered valve seat.

2. The iron-based sintered valve seat according to claim 1, wherein a raw material powder formulated such that said matrix has a composition comprising by mass 1.3-1.85% of C, 0.4-0.8% of Si, 10.0-13.0% of Cr, 0.8-1.2% of Mo, 1.7-2.2% of V, and 0.80-1.72% of P, the balance being Fe and inevitable impurities, is used.

3. The iron-based sintered valve seat according to claim 1, wherein said hard particles are made of an Fe—Mo—Si alloy and/or a Cr—W—Co—Fe alloy.

4. The iron-based sintered valve seat according to claim 3, wherein said Fe——Mo—Si alloy comprises by mass 40-70% of Mo, 0.4-2.0% of Si, and 0.1% or less of C, the balance being Fe and inevitable impurities; and wherein said Cr—W—Co—Fe alloy comprises by mass 27-33% of Cr, 22-28% of W, and 8-12% of Co, the balance being Fe and inevitable impurities.

5. The iron-based sintered valve seat according to claim 4, wherein said Si, Cr, Mo and V are by mass 0.5-0.9%, 8.0-11.0%, 5.0-10.0%, and 1.4-1.9%, respectively, based on the iron-based sintered valve seat.

6. The iron-based sintered valve seat according to claim 1, which has a density of 7.5-7.8 g/cm$^3$.

* * * * *